United States Patent Office 3,539,626
Patented Nov. 10, 1970

3,539,626
SUBSTITUTED UREA DERIVATIVES
André R. Gagneux, Basel, Switzerland, assignor to Geigy Chemical Corporation, Ardsley, N.Y., a corporation of New York
No Drawing. Continuation-in-part of applications Ser. No. 593,678 and Ser. No. 593,703, both Nov. 14, 1966. This application Dec. 12, 1968, Ser. No. 783,411
Claims priority, application Switzerland, Nov. 18, 1965, 15,907/65, 15,909/65
Int. Cl. C07d 7/24; C07c 157/06, 122/16
U.S. Cl. 260—999
9 Claims

ABSTRACT OF THE DISCLOSURE

Substituted urea derivatives having useful antibacterial activity as well as starting materials for their production and methods for preparing the said starting materials; pharmaceutical compositions containing the subject urea derivatives as active ingredient and method for the production of tuberculostatic effects. An illustrative embodiment is 1-(1-adamantyl)-3-(3,4-dichlorophenyl)urea.

CROSS REFERENCE

This is a continuation-in-part of Ser. Nos. 593,678 and 593,703, both filed Nov. 14, 1966 and both now abandoned.

DETAILED DISCLOSURE

The present invention relates to substituted urea derivatives having valuable pharmacological properties. The invention is further concerned with processes for the production of these substituted urea derivatives and also comprehends certain new amines which are used as starting materials for one such process as well as processes for the production of the said starting materials.

It has been found that the hitherto unknown urea derivatives of the Formula I

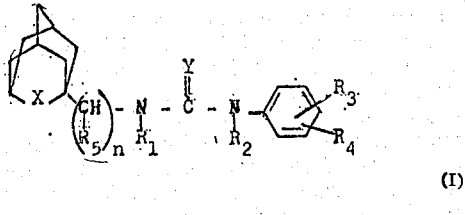

(I)

wherein
X is methylene, ethylene or oxygen,
Y is oxygen or sulfur,
$R_1$, $R_2$ and $R_5$ are independently hydrogen or methyl,
$R_3$ and $R_4$ are independently hydrogen, chloro, trifluoromethyl, methyl or methoxy and
$n$ represents zero or one, have excellent antibacterial, in particular tuberculostatic activity. The biological properties characterized the compounds of Formula I as active ingredients of disinfectants as well as of compositions for treatment of tuberculosis.

To produce the new compounds of Formula I, an amine of Formula II

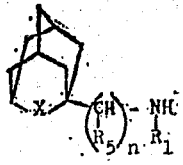

(II)

wherein X, $R_1$, $R_5$ and $n$ have the meanings given above for Formula I, is reacted with a phenyl isocyanate or isothiocyanate of the Formula III

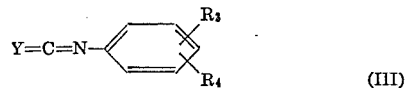

(III)

or with a reactive functional derivative of a carbanilic or thiocarbanilic acid of Formula IV

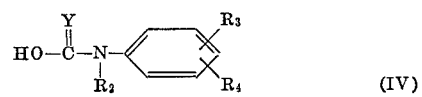

(IV)

wherein Y, $R_2$, $R_3$ and $R_4$ have the meanings given for Formula I.

Suitable functional derivatives of acids of Formula IV are, e.g., their lower alkyl ester, phenyl esters, amides, N-nitro amides, N-acetyl amides, N,N-diphenyl amides or, particularly when $R_2$ is methyl also their chlorides.

The method of the reaction depends on the starting materials used. Reactions with phenyl isocyanates or isothiocyanates of the Formula III are performed, for example, at temperatures between 0° and 100°. Instead of isocyanates or isothiocyanates, also compounds can be used which, as is known, are converted under the reaction conditions into such, for example, 1,3,3-triphenyl ureas the phenyl radical in the 1-position of which is, if desired, substituted corresponding to the definition of $R_3$ and $R_4$. In this case, the reactions can be performed also at higher temperatures, up to about 250°. The amounts of the reaction components can be stoichiometric proportions or an excess of one component can be chosen. They can be added in any order desired, preferably however, the isocyanate is added to the amine. Examples of solvents or diluents which can be used for both reaction components, depending on the reaction temperature necessary, are benzene, toluene, xylene, chlorobenzene, chloroform, carbon tetrachloride, acetone, acetonitrile, tetrahydrofuran, dioxane and/or diethylene glycol dimethyl ether, and also lower alkanols can be used for the amines.

Reactions with lower alkyl esters or phenyl esters of carbanilic acids of thiocarbanilic acids of Formula IV can be performed at temperatures between 0° and 250° in the absence of solvents or in one of the solvents mentioned above. Reactions with N-nitro amides, i.e., 1-phenyl-3-nitro ureas optionally substituted corresponding to the definition of $R_2$, $R_3$ and $R_4$ are performed, e.g., in water or in an aqueous-organic medium such as dioxane/water, at the boiling temperature, and reactions with the amides are performed at temperatures of up to about 200° in the presence or absence of solvents such as glacial acetic acid or phenol. A temperature range of between 0° and about 150° can be used for the reaction of amines of the Formula II with carbanilic acid chlorides or thiocarbanilic acid chlorides substituted as defined; an excess of the amine to be reacted or a tertiary organic base such as triethylamine, dimethyl aniline or pyridine or also an inorganic base such as sodium hydroxide, sodium or potassium carbonate can be used as acid binding agent and, as solvent, e.g., again one of those mentioned above can be used.

Compounds of Formula I are obtained by a second process which is related to the first, by reacting an amine of Formula V

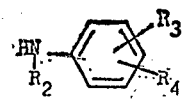

(V)

wherein $R_2$, $R_3$ and $R_4$ have the meanings given for

Formula I, with an isocyanate or isothiocyanate of the Formula VI

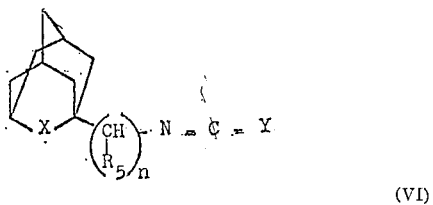

(VI)

or with a reactive functional derivative of a carbamic or thiocarbamic acid of Formula VII

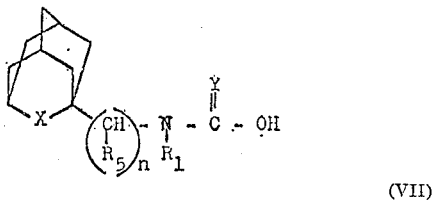

(VII)

wherein X, Y, $R_1$, $R_5$ and $n$ have the meanings given for Formula I.

Suitable reactive functional derivatives of acids of the Formula VII are, e.g., their lower alkyl esters, phenyl esters, amides, N-nitro amides, N-acetyl amides, N,N-diphenyl amides or, particularly when $R_1$ is methyl, also their chlorides. The reactions are performed, in general, analogously to the corresponding reactions in the first process.

Compounds of the Formula I are produced by a third process by reacting a compound of the Formula VIII

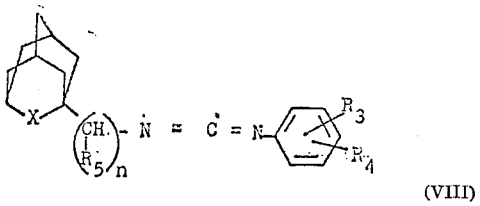

(VIII)

wherein X, $R_3$, $R_4$, $R_5$ and $n$ have the meanings given for Formula I with a compound of the Formula IX $$H_2Y \qquad (IX)$$

wherein Y has the meaning given for Formula I.

The addition of water or hydrogen sulphide is effected easily by treatment of a compound of Formula VIII with water or with diluted mineral acids or with a mixture of water or diluted mineral acids and an organic solvent miscible therewith, such as tetrahydrofuran or dioxane, or by passing hydrogen sulphide into a solution which contains compounds of the general Formula VIII in an organic solvent or by treating such a solution with a reagent which gives off hydrosulphide ions such as sodium hydrogen sulphide or sodium sulphide. The reactions mentioned above are performed at temperatures between 0° and 150° depending on the reactivity of the components used and the boiling temperature of any solvent or diluent used.

Finally, certain compounds of Formula I obtained by one of the processes given above can also be converted into other compounds of this formula. In particular, thioureas, i.e., compounds of Formula I wherein Y is sulphur and X, $R_1$, $R_2$, $R_3$, $R_4$ $R_5$ and $n$ have the meanings given in Formula I, can be converted into the corresponding ureas. Oxidation agents which are suitable for the performance of this variation of the process are, e.g., hydrogen peroxide in solvents miscible with water, sodium peroxide in alkaline-aqueous solution, potassium ferricyanide, ferric chloride, potassium permanganate, sodium or potassium hypochlorite in aqueous or aqueous-organic medium.

Of the starting materials of Formula II, 1-adamantane amine and tricyclo[4.3.1.1^{3.8}]undecane-3-amine (homoadamantane-1-amine) are known. Compounds of the Formula II wherein $n$ represents 1, X represents oxygen, and $R_1$ and $R_5$ are hydrogen or methyl may be prepared by known techniques from the known 1-formyl- or 1-acetyl-2-oxa-adamantane.

1-amino- and 1-methylamino-2-oxa-adamantane have not, however, been known hitherto. These compounds may be obtained by a process reacting the reaction mixture of bicyclo[3.3.1]nonane-3, 7-dione and an amine of the Formula X $$R_1'—NH_2 \qquad (X)$$

wherein $R_1'$ represents methyl or α-aralkyl, particularly benzyl, or an N-substituted 3-amino-2-oxa-adamantan-1-ol, which can be isolated from the above reaction mixture, of the Formula XI

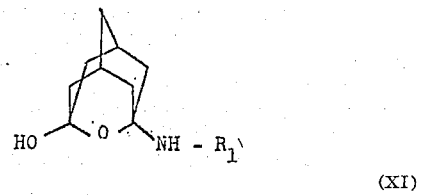

(XI)

wherein $R_1'$ has the meanings given above, with a complex hydride, particularly lithium aluminum hydride, the reaction being performed in an organic liquid containing ether oxygen such as tetrahydrofuran, diethyl ether or a mixture thereof, and, when $R_1'$ represents α-aralkyl, reacting the reaction product with catalytically activated hydrogen to split off this group, so as to produce a compound having the Formula IIa

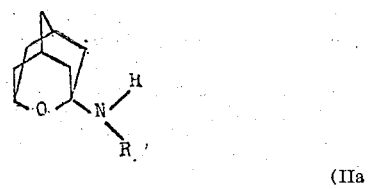

(IIa)

wherein R has the meaning given under Formula I.

The compounds of Formula XI are preferably produced immediately before the reduction by heating the reaction components, bicyclo [3.3.1]nonane-3,7-dione and an amine of the Formula X, in a solvent which, at the same time, is suitable for the subsequent reduction, e.g., tetrahydrofuran or dibutyl ether. The preferred way of preparation is the immediate reduction of the reaction mixture with a complex hydride; it is, however, possible to isolate first the starting material of the Formula XI and to submit it to reduction in a second reaction step.

The hydrogenolysis which, if necessary, follows the reduction is performed, e.g., in the presence of a noble metal catalyst such as palladium on charcoal, in a suitable organic solvent such as ethanol, under increased pressure and at a raised temperature, e.g., under 20–100 atm. and about 80–120°.

The new substituted urea derivatives of Formula I can be administered orally and also parenterally in the usual dosage forms for the therapy of tuberculous diseases. Suitable forms for oral administration are, e.g., tablets, dragees (sugar coated tablets) and gelatine capsules. For parenteral administration, e.g., solutions and dispersions in mixtures of water and suitable solubility promoters and/or emulsifying agents can be used and, particularly for intra-muscular administration, also solutions in suitable fatty oils can be used. The compounds of Formula I are of particular importance for the local therapy of above diseases where they also can be applied in forms not made up into single dosages such as ointments, powders and aerosols.

Dosage units for oral administration preferably contain between about 0.3 g. and about 10 g. of a compound as defined in Formula I. They are produced, e.g., by combining the active substance with solid, pulverulent carriers such as lactose, saccharose, sorbitol, mannitol; starches such as potato starch, maize starch or amylopectin, also laminaria powder or citrus plup powder; cellulose derivatives or gelatine, optionally with the addition of lubricants such as magnesium or calcium stearate or polyethylene glycols (Carbowax) of suitable molecular weights, to form tablets or dragee cores. The latter may be coated with concentrated sugar solutions which can also contain, e.g., gum arabic, talcum and/or titanium dioxide, or with a lacquer dissolved in easily volatile organic solvents or mixture of solvents. Dyestuffs can be added to these coatings, e.g., to distinguish between varying dosages of active substance.

Ampoules for parenteral, particularly intramuscular administration preferably contain an oil-soluble compound as defined in Formula I in a concentration of, preferably, 10% in oily solution to which suitable stabilizing agents and buffer substances may be added.

Pharmaceutical compositions for local therapy are prepared by mixing a compound as defined in Formula I with a suitable carrier, e.g., Vaseline. The active substance should be present in a concentration of, preferably, 5%.

As mentioned above, the subject compounds possess valuable pharmacological properties; they can be characterized as antibacterial agents, especially as tuberculostatic agents.

The tuberculostatic activity of compounds of Formula I was demonstrated by determining the minimal inhibiting concentration of various test substances. The test substances dissolved in methyl Cellosolve, were added, in varying concentrations, to a culture medium (Youmans serum agar) which was subsequently inoculated with human tuberculosis bacteria. The cultures were then incubated for 18 days at 37° C. In this way the minimum concentration of test substance in the culture medium, required to prevent culture growth, was determined.

The following compounds:

(a) 1-(1-adamantyl)-3-(3,4-dichlorophenyl)urea
(b) 1-(1-adamantyl)-3-(4-chlorophenyl)urea
(c) 1-(1-adamantyl)-3-(p-tolyl)urea
(d) 1-(1-adamantyl)-3-($\alpha,\alpha,\alpha$-trifluoro-4-chlor-m-tolyl) urea and
(e) 1-(adamant-1-yl)-3-(3,4-dichlorophenyl)urea were found to have an excellent inhibitory effect on the growth of Typ. humanus (A5) and an isonicotinic acid hydrazide resistant mutant (H37Rv) thereof, at low concentrations.

Illustratively, the acute toxicity was determined for 1-(1-adamantyl)-3-(3-trifluoromethyl-4-chlorophenyl)urea and 1-(1-adamantyl)-3-(4-methylphenyl)urea. The $LD_{50}$ on oral administration to mice was higher than 400 mg./kg. in a single dose for 1-(1-adamentyl)-3-(3-trifluoromethyl-4-chlorophenyl)urea and higher than 400 mg./kg. for 1-(1-adamantyl)-3-(4-methylphenyl)urea.

The following examples illustrate the production of the new substituted urea derivatives of Formula I and of hitherto unknown intermediate products, but the scope of the invention is in no way limited thereto. The temperatures are given in degrees centigrade.

EXAMPLE 1

5.5 g. (36.5 mM.) of 1-adamantane amine in 100 ml. of abs. benzene and 6.25 g. (33.3 mM.) of 3,4-dichlorophenyl isocyanate are both added to 100 ml. of the same solvent whereupon heat is generated and crystals are formed. The mixture is heated for 1 hour at 80°, then cooled and filtered. The filter residue is stirred for 1 hour in 100 ml. of 1 N hydrochloric acid, filtered, washed with water until the reaction is neutral and dried over phosphorus pentoxide, whereupon 1-(1-adamantly)-3-(3,4-dichlorophenyl)urea is obtained, M.P. 220–221°.

The following ureas are produced analogously on using the corresponding substituted phenyl isocyanates and either 1-adamantane amine or N-methyl-1-adamantane amine or tricyclo-[4.3.1.1$^{3.8}$]undecane-3-amine.

(a) 1-(1-adamantyl)-3-(p-tolyl)urea, M.P. 252–256°;
(b) 1-(1-adamantyl)-3-(p-chlorophenyl)urea, M.P. 242–243°;
(c) 1-(1-adamantlyl - 3 - (2,4 - dichlorophenylurea, M.P. 221–222°;
(d) 1-(1-adamantyl)-3-(6-chloro-$\alpha,\alpha,\alpha$-trifluoro-m - tolyl) urea, M.P. 233–234°;
(e) 1-(1-adamantyl) - 3 - (o-methoxyphenyl)urea, M.P. 234–236°;
(f) 1-(1-adamantyl) - 3 - (p-methoxyphenyl)urea, M.P. 235–238°;
(g) 1-(1-adamantyl)-3-(2,5-dimethoxyphenyl)urea, M.P. 240–242°;
(h) 1-(1-adamantyl)-3-(m-acetylphenyl)urea, M.P. 200–04°;
(i) 1-(1-adamantyl)-1-methyl-3 - (3,4-dichlorophenyl) urea, M.P. 193–195°;
(j) 1 - (tricyclo[4.3.1.1$^{3.8}$]undec - 3 - yl) - 3 - )3,4 - dichlorophenyl)urea, M.P. 233–236°.

EXAMPLE 2

5.0 g. (33 mM.) of 1-adamantane amine in 50 ml. of abs. toluene are added to 5.70 g. (28 mM.) of 3,4-dichlorophenyl isothiocyanate in 50 ml. of abs. toluene whereupon heat is generated and crystals are formed. The mixture is heated for 1 hour on a steam bath, cooled, filtered and the precipitate is washed with ether. The solid phase is stirred in 100 ml. of 1 N hydrochloric acid and 20 ml. of methanol, filtered off, washed with water until the washing water is neutral and finally recrystallised from dioxane/ethanol. 1-(1-adamantyl)-3-(3,4 - dichlorophenyl)-2-thiourea, M.P. 193–195°.

The following 2-thioureas are obtained analogously on using, e.g., the corresponding substituted phenyl isothiocyanates and 1-adamantane amine:

(a) 1-(1-adamantyl)-3-(p-chlorophenyl)-2-thiourea, M.P. 172–173°;
(b) 1 - (1-adamantyl)-3-(2,4-dichlorophenyl)-2-thiourea, M.P. 181–183°;
(c) 1-(1-adamantyl)-3-(4-chloro-$\alpha,\alpha,\alpha$-trifluoro-m-tolyl)-2-thiourea, M.P. 169–171°.

EXAMPLE 3

1 - (2 - oxa - adamant - 1 - yl) - 3 - (3,4 - dichlorophenyl)urea, M.P. 208–210°, is obtained analogously to example 1 starting from 5.1 g. (33 mM.) of 2-oxa-adamantane-1-amine and 5.65 g. (30 mM.) of 3,4-dichlorophenyl isocyanate.

The 2-oxa-adamantane-1-amine used as starting material is produced, e.g., as follows:

(a) 7.60 g. (50 mM.) of bicyclo[3.3.1]nonan-3,7-dione (produced according to H. Stetter et al., Chem. Ber. 96, 694–698 (1963)) and 5.35 g. (50 mM.) of benzylamine in 300 ml. of abs. tetrahydrofuran are refluxed for 30 minutes. After cooling, this mixture, which contains 3-benzylamino-2-oxa-adamantan-1-ol, is added dropwise to 3.80 g. (100 mM.) of lithium aluminum hydride in 100 ml. of abs. ether while stirring vigorously. The whole is then stirred for 6 hours at a bath temperature of 40° and then, while cooling with ice, 19 ml. of 1 N sodium hydroxide solution are slowly added dropwise. The precipitate formed is filtered off through Hyflo. The clear filtrate is evaporated, the residue is dissolved in 500 ml. of acetone and 5 ml. of concentrated hydrochloric acid are added whereupon the hydrochloride crystallises immediately. The hydrochloride is filtered off, washed with cold acetone, dried for 6 hours under 12 torr and N-benzyl-2-oxaadamantane-1-amine hydrochloride is obtained; it melts at 242–245°.

(b) 9.30 g. (33 mM.) of N-benzyl-2-oxa-adamantane-1-amine hydrochloride in 100 ml. ethanol and in the presence of 2.0 g. of 5% palladium charcoal are kept for 2 hours at 100° under a hydrogen pressure of 50 atm. After cooling, the catalyst is filtered off, the filtrate is evaporated, 25 ml. of concentrated sodium hydroxide solution are added to the residue which is then extracted with 200 ml. of ether. The ether solution is dried over potassium carbonate and concentrated and the residue is sublimed at 60° under 0.1 torr. 2-oxa-adamantane-1-amine (M.P. 148–154°) is obtained. The hydrochloride melts at 280°.

EXAMPLE 4

A solution of 2.4 g. (10 mM.) of N-methyl-N-(3,4-dichlorophenyl)-chloroform amide in 50 ml. of abs. benzene is added dropwise to a solution of 3.32 g. (22 mM.) of 1-adamantane amine in 50 ml. of abs. benzene. The reaction mixture is heated to reflux temperature whereupon 1-adamantane amine hydrochloride begins to separate out. After refluxing for 8 hours, the reaction mixture is cooled and the precipitate is filtered off. The filtrate is extracted twice with 50 ml. of 1 N hydrochloric acid each time and then twice with 50 ml. of water each time, dried over sodium sulphate and concentrated to dryness. After recrystallising the residue from cyclohexane/hexane, 1-(1-adamantyl)-3-(3,4-dichlorophenyl) - 3 - methyl urea is obtained, M.P. 180–182°.

EXAMPLE 5

A solution of 0.99 g. (6 mM.) of 1-adamantane methylamine is added to a solution of 1.13 g. (6 mM.) of 3,4-dichlorophenyl isocyanate in 10 ml. of abs. toluene. After heating for 2 hours on a steam bath, it is cooled whereupon crystals separate out. These are filtered off, washed with toluene and recrystallised from ethanol. The 1-(1-adamantyl)-1-methyl-3-(3,4-dichlorophenyl)urea so obtained melts at 189–191°.

EXAMPLE 6

810 mg. (4.5 mM.) of 1-(1-adamantyl)-ethylamine in 7.5 ml. of abs. toluene are added to a solution of 850 mg. (4.5 mM.) of 3,4-dichlorophenyl isocyanate in 7.5 ml. of abs. toluene. The mixture is heated for 2 hours on a steam bath and then the solvent is removed. The residue is taken up in hot methanol; on cooling 1-($\alpha$-methyl-1-adamantyl-methyl) - 3 - (3,4-dichlorophenyl) urea crystallises, M.P. 195–198°. The product contains half a mol of methanol per mol urea derivative. In an analogous manner 1-(1-adamantyl-methyl) - 3 - (3,4-dichlorophenyl)urea was prepared starting from 1-(1-adamantyl)ethyl amine.

EXAMPLE 7

885 mg. (5 mM.) of 1-adamantane isocyanate and 535 mg. (5 mM.) of p-toluidine are dissolved in 25 ml. of abs. benzene and the solution is refluxed for 15 hours. After cooling, the crystals which separate are filtered off under suction at room temperature and washed with benzene. 1-(1-adamantyl)-3-(p-tolyl)urea melts at 254–255°.

EXAMPLE 8

680 mg. of 30% hydrogen peroxide dissolved in 10 ml. of methanol are added to the suspension of 710 mg. of (1-adamantyl)-2-(3,4-dichlorophenyl)thiourea in 10 ml. of methanol. The mixture is refluxed and, after 30 minutes, a clear solution is formed. After another 30 minutes, 10 ml. of water are added dropwise to the hot solution. The product which precipitates, 1-(1-adamantyl)-3-(3,4-dichlorophenyl)urea, is filtered off hot and recrystallised from 80% ethanol. It melts at 218–221°.

EXAMPLE 9

1.77 g. (5 mM.) of 1-(1-adamantyl)-3-(3,4-dichlorophenyl)thiourea are dissolved at 30° in 180 ml. of purified dioxane. 18 ml. of water and, finally, 9 g. of lead oxide (PbO) (40 mM.) are added. The whole is stirred, first for 15 hours at room temperature and then for 3 hours at reflux temperature. The reaction mixture is filtered hot through Hyflo. Water (220 ml.) is added to the hot filtrate until it remains opaque. On cooling, crystals separate out. After recrystallisation from ethanol, the 1-(1-adamantyl)-3-(3,4-dichlorophenyl)urea melts at 215–220°.

EXAMPLE 10

200 mg. (0.62 mM.) of 1-(1-adamantyl)-3-(3,4-dichlorphenyl)carbodiimide, 15 ml. of dioxane and 5 ml. of 0.1 N hydrochloric acid are refluxed together for 1 hour. After cooling, a little water is added and the crystals which separate are filtered off. Recrystallisation from ethanol yields 1-(1-adamantyl)-3-(3,4-dichlorophenyl)urea; M.P. 220–224°.

The 1 - (1-adamantyl)-3-(3,4-dichlorophenyl)carbodiimide necessary for the reaction described above is produced as follows:

5.32 g. (15 mM.) of 1-(1-adamantyl)-3-(3,4-dichlorophenyl)thiourea are dissolved at room temperature in 600 ml. of abs. dioxane. Then 6 g. (50 mM.) of anhydrous magnesium sulphate and finally 26.8 g. (120 mM.) of lead oxide (PbO) are added. The whole is stirred for 15 hours at 60°, then cooled and filtered through Hyflo. The clear, colourless filtrate is concentrated to dryness in vacuo. The oily residue is taken up in 300 ml. of pentane. The opaque solution is clarified by filtration through active charcoal and then concentrated whereupon crude 1-(1-adamantyl) - 3 - (3,4-dichlorophenyl)carboiimide crystallises out. After crystallisation from pentane at −15°, pure product which melts at 60–61° is obtained.

EXAMPLE 11

Hydrogen sulphide is introduced for 3 hours into the boiling solution of 321 mg. (1 mM.) of (1-adamantyl)-3-(3,4-dichlorophenyl)carbodiimide in 10 ml. of abs. dioxane. The yellow reaction solution is concentrated to dryness. The yellow residue is washed twice with 5 ml. of ethanol each time whereupon the insoluble part, 1-(1-adamantyl)-3,4-dichlorophenyl)thiourea crystallises; M.P. 189–192°.

EXAMPLE 12

(a) Tablet preparation.—1000 g. 1-(1-adamantyl)-3-(3,4-dichlorophenyl)urea chlorohydride were mixed with 351.60 g. of lactose and 339.40 g. of potato starch. The mixture was moistened with an alcoholic solution of 20 g. stearic acid and granulated through a sieve. After drying the granulate was mixed with 320 g. of potato starch, 400 g. of talcum, 5.0 g. of magnesium stearate and 64 g. of colloidal silica and the mixture was pressed out into 10,000 tablets weighing 250 mg. and containing 100 mg. of active substance each. The tablets may be grooved for better adaptation of the dosage.

(b) Suppository preparation. — 0.10 g. of 1 - (1-adamantyl) - 3 - (3,4 - dichlorophenyl)urea were mixed with 2.00 g. of parafin oil of low viscosity, and the mixture was added to a liquid mass of 10.00 g. animal fat and white Vasoline to give a total weight of 100.00 g. The mixture was then allowed to solidify with stirring and shaped.

What is claimed is:
1. A compound of the formula

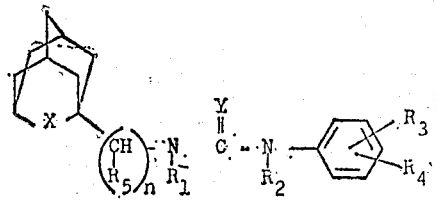

wherein

X is methylene, ethylene or oxygen;
Y is oxygen or sulfur;
$R_1$, $R_2$ and $R_5$ are independently hydrogen or methyl;
$R_3$ and $R_4$ are independently hydrogen, chloro, trifluoromethyl, methyl or methoxy; and
$n$ is zero or one.

2. A compound as defined in claim 1, wherein X is methylene, ethylene or oxygen; Y is oxygen or sulfur; $R_1$ is hydrogen or methyl; $R_2$ is hydrogen, $R_3$ and $R_4$ are independently hydrogen, chloro, methyl or methoxy; and $n$ is zero.

3. A compound as defined in claim 1, wherein X is methylene; Y is oxygen or sulfur; $R_1$ is hydrogen; $R_2$ is hydrogen or methyl; $R_3$ and $R_4$ are independently hydrogen, chloro or methyl; $R_5$ is hydrogen or methyl; and $n$ is zero or one.

4. A compound as defined in claim 1, wherein X is methylene; Y is oxygen; $R_1$, $R_2$ and $R_3$ are hydrogen; $R_4$ is p-methyl; and $n$ is zero.

5. A compound as defined in claim 1, wherein X is methylene; Y is oxygen; $R_1$, $R_2$ and $R_3$ are hydrogen; $R_4$ is p-chloro; and $n$ is zero.

6. A compound as defined in claim 1, wherein X is methylene; Y is oxygen; $R_1$ and $R_2$ are hydrogen; $R_3$ and $R_4$ are chloro in 3- and 4-positions; and $n$ is zero.

7. A compound as defined in claim 1, wherein X is methylene; Y is sulfur; $R_1$ and $R_2$ are hydrogen; $R_3$ and $R_4$ are chloro in 3- and 4-positions; and $n$ is zero.

8. A compound as defined in claim 1, wherein X is ethylene; Y is oxygen; $R_1$ and $R_2$ are hydrogen; $R_3$ and $R_4$ are chloro in 3- and 4-positions; and $n$ is zero.

9. A compound as defined in claim 1, wherein X is methylene; Y is oxygen; $R_1$ and $R_2$ are hydrogen; $R_3$ is trifluoromethyl in 3-position; $R_4$ is chloro in 4-position; and $n$ is zero.

References Cited

FOREIGN PATENTS 1,246,722   8/1967   Germany.

OTHER REFERENCES

Stetter et al.: Angew. Chemie, vol. 74, pp. 354–5 (1962).

HENRY R. JILES, Primary Examiner

JOHN M. FORD, Assistant Examiner

U.S. Cl. X.R.

260—345.7, 544, 553, 999, 345.9, 345.1, 518, 513.5, 471, 463, 453, 454, 514, 345.8, 468, 551